United States Patent [19]
Wadman et al.

[11] Patent Number: 6,025,037
[45] Date of Patent: Feb. 15, 2000

[54] METHOD OF CURING A FILM

[75] Inventors: Sipke Wadman; Marcus J. Van Bommel, both of Eindhoven, Netherlands

[73] Assignee: U.S. Philips Corporation, New York, N.Y.

[21] Appl. No.: 08/423,606

[22] Filed: Apr. 17, 1995

[30] Foreign Application Priority Data

Apr. 25, 1994 [EP] European Pat. Off. .............. 94201138

[51] Int. Cl.⁷ ..................................................... B05D 3/00
[52] U.S. Cl. ........................ 427/554; 427/64; 427/385.5; 427/398.3; 427/555; 427/559; 427/596
[58] Field of Search ................................... 427/555, 559, 427/596, 385.5, 398.3, 554, 64–66, 68; 118/722

[56] References Cited

U.S. PATENT DOCUMENTS

| | | | |
|---|---|---|---|
| 3,743,777 | 7/1973 | Hanus et al. ............................. | 427/508 |
| 4,593,228 | 6/1986 | Albrechtson et al. ................ | 427/66 X |
| 4,693,906 | 9/1987 | Lindmayer ............................. | 427/66 X |
| 5,154,945 | 10/1992 | Baldwin et al. ........................ | 427/596 |
| 5,240,748 | 8/1993 | Vanesdonk et al. .................... | 427/554 |

FOREIGN PATENT DOCUMENTS

| | | | |
|---|---|---|---|
| 6134826 | 2/1986 | Japan .............................. | H01J 9/227 |
| 62195828 | 8/1987 | Japan .............................. | H01J 9/227 |
| 6348725 | 1/1988 | Japan .............................. | H01J 9/227 |

OTHER PUBLICATIONS

Search Report.

*Primary Examiner*—Bernard Pianalto

[57] ABSTRACT

A sol-gel coating of conductive materials, such as ITO, which is applied to a substrate, for example a display window of a cathode ray tube, is cured by means of a laser. This is preferably carried out in a water-containing atmosphere, for example an aqueous aerosol and/or a hydrogen-containing gas, such as a forming gas. This results in a stable resistance reduction by several hundred times.

11 Claims, 1 Drawing Sheet

METHOD OF CURING A FILM

BACKGROUND OF THE INVENTION

The invention relates to a method of curing a film on a surface of a cathode ray tube.

Cathode ray tubes are used, inter alia, in television receivers, computer monitors and oscilloscopes.

A method of the type mentioned in the opening paragraph is known per se. A film is applied to a surface of the display window of a cathode ray tube. This film is sprayed in the form of a liquid on the surface, whereafter it is dried and cured. Customarily, the film is cured in a furnace. The high temperature in the furnace causes curing of the film. The curing time of the film ranges of from 30 minutes to 1 hour. Said method is less suitable for mass production. In a production line the aim is to adjust the duration of the various process steps to each other. A display window or display tube can then be subjected to the various process steps either sequentially or "in-line". A process step typically takes approximately 1 minute. If the duration of a process step substantially exceeds the average duration, then said process step cannot be carried out "in-line", as the velocity in the production line is generally determined by the slowest process step. The relevant process step must be carried out outside the production line. To this end, the display window or display tube must be removed from the production line and an arrangement for carrying out said process step must be set up alongside the production line. This results in an increase of the production costs as well as of the risk of breakage.

It is an object of the invention to provide a method of the type mentioned in the opening paragraph, which is more suitable for "in-line" application.

To this end, a method in accordance with the invention is characterized in that the film is cured by a laser beam which is incident on a limited area of the film and which scans the surface.

The invention is based on the insight that by means of a laser beam the part of the film situated in said area can be cured within a few seconds. It has been found that the film can be cured in a period of time ranging from ten seconds to several minutes by scanning the surface with said laser beam. The movement of the laser beam over the surface has the advantage that the temperature of the element itself, for example the display window, increases only slightly. Only the film and the uppermost layer of the surface (i.e. the portion of the element situated directly underneath the film) are subject to a substantial increase in temperature. By virtue thereof, thermal stresses occur hardly, or not at all. Consequently, breakage caused by thermal stresses is precluded. The latter advantage is particularly important in embodiments of the method in accordance with the invention which are characterized in that the film is applied to the outside of an evacuated cathode tube, for example the display window or the cone of the evacuated cathode ray tube. In general, an evacuated display tube cannot be exposed to a high temperature for a prolonged period of time. In the known method, the temperature of the display tube and hence of the furnace must be limited to approximately 100° C.–200° C. At higher temperatures, there is a substantial risk of breakage of the display tube. In the method in accordance with the invention, the temperature of the part of the film which is irradiated by the laser beam is several hundred degrees centigrade. The temperature of the display tube as a whole, however, is much lower. The latter advantage (reduced risk of breakage) is important, in particular, for display tubes comprising a display window having a diagonal whose length is in excess of 50 cm. The time which is necessary to heat the tubes to the desired temperature in a furnace increases as the tubes are larger, and hence the risk of breakage increases also. A preferred embodiment of the method in accordance with the invention is characterized in that the film absorbs little laser light and the release of energy is concentrated in the area underneath the film to a depth of less than 10 $\mu$m.

OBJECTS AND SUMMARY OF THE INVENTION

The absorption of laser light by a material generally proceeds in accordance with a power of e ($e^{-d/d0}$), wherein d0is a constant. For the film, preferably, d0 substantially exceeds the thickness of the film, and for the substrate, preferably, d0 is below 10 $\mu$m. By virtue thereof, the laser-light absorption of the film is limited and the energy of the laser is released in a thin layer (<10 $\mu$m) directly underneath the film. In comparison with a situation in which a substantial part of the laser energy is released in the film, the preferred method is more favourable because the temperature in the film is more homogeneous and the risk of ablation of the film is reduced.

A preferred embodiment of the invention is characterized in that a conductive layer is cured in a hydrogen-containing atmosphere.

It has been found that by carrying out the laser treatment in a hydrogen-containing atmosphere, the conductance of the layer is favourably affected.

A requirement to be met by cathode ray tubes is that the field strength of the stray field emitted by the cathode ray tube is below a minimum value at some distance from the cathode ray tube. This is alternatively referred to as "electromagnetic shielding (EMS)". To meet this requirement, an applied conductive layer must exhibit a relatively low electric resistance. It has been found, however, that if the layers are cured by annealing, the conductivity of the conductive layers increases, under the influence of air, and hence the EMS decreases.

If these layers, for example ITO layers (layers comprising $SnO_2/In_2O_3$), are cured by means of a laser in a hydrogen-containing atmosphere, the resistance is reduced in such a manner that this reduction is stable.

A further preferred embodiment is characterized in that laser heating occurs in a water-containing atmosphere. This also leads to an improvement of the conductivity in a stable manner.

The effects in question are substantial and result in an improvement of several hundred times, said improvement being stable and re-heating to a high temperature does not adversely affect the conductivity.

The method can be used to apply films (also referred to as coatings) on an element of a cathode ray tube, however, the above-mentioned disadvantages of the prior art as well as the advantages of the invention also apply to the application of coatings on other substrates, such as in and on LCDs (Liquid Crystal Displays) or on synthetic resins.

The invention further relates to a device for curing a film on a surface, for example the window of a cathode ray tube.

BRIEF DESCRIPTION OF THE DRAWINGS

These and other aspects of the invention will be explained in greater detail by means of exemplary embodiments and with reference to the accompanying drawings, in which.

The Figures are schematic and not drawn to scale, and like reference numerals generally refer to like parts.

DESCRIPTION OF THE PREFERRED

Figure 1:
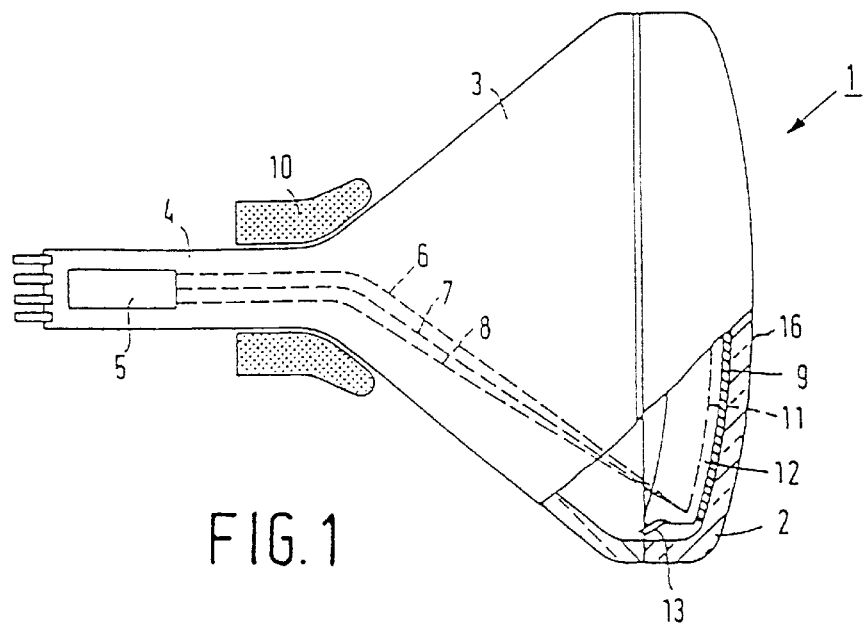
FIG. 1 is a sectional view of a cathode ray tube.

FIG. 1 is a sectional view of a cathode ray tube, in this example a colour cathode ray tube, comprising an evacuated envelope 1 having a substantially rectangular display window 2, an enveloping portion 3 and a neck 4. In the neck there is provided an electrode system 5 for generating, in this example, three electron beams 6, 7 and 8. In this example, the electron beams are generated in one plane (in this case the plane of the drawing) and are directed to an electroluminescent display screen 9 which is provided on the inside of the display window and which comprises a phosphor pattern consisting of a large number of phosphor elements luminescing in red, blue and green. The phosphor elements may be, for example, in the form of dots or lines. On their way to the display screen 9, the electron beams 6, 7 or 8 are deflected across the display screen 9 by means of a deflection unit 10 and pass through a color selection electrode 11 which comprises a thin plate having apertures 12 and which is arranged in front of the display screen 9. The three electron beams 6, 7 and 8 pass through the apertures 12 of the color selection electrode 11 at a small angle and, consequently, each electron beam is incident on phosphor elements of only one color. The color selection electrode 11 is suspended in front of the display screen by means of suspension elements 13. A surface of the display window, in this example the outside surface 16, is provided with a film. Such a film can be used as an anti-reflective or antistatic film. In accordance with a known method, such a film is provided, dried and subsequently cured. The film is customarily cured in a furnace. As described above, such a method is less suitable for mass-production, as the process step in which the film is cured can generally not be carried out "in-line". In addition, if the film is provided on a display tube which has already been evacuated, there is a substantial risk that the display tube will break. It is an object of the invention to provide a method in which the above problems are reduced.

Figure 2:
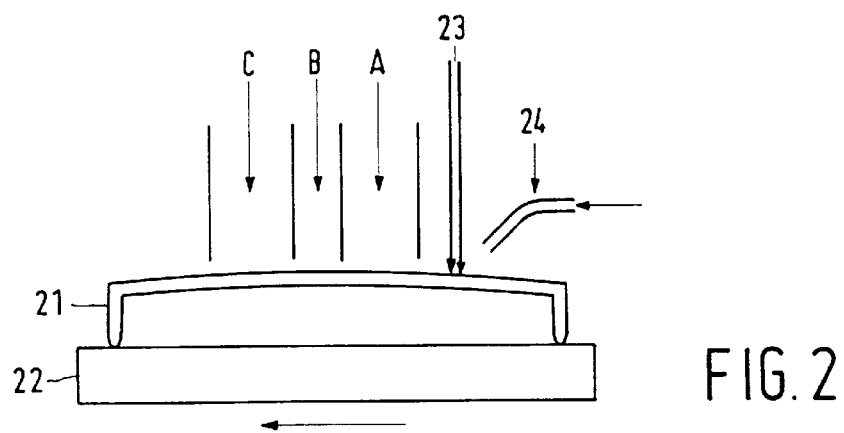
FIG. 2 illustrates one arrangement for carrying out the method in accordance with the invention.

A simple embodiment of the method in accordance with the invention is illustrated in FIG. 2. The window of or for a cathode ray tube 21 or another substrate (glass, ceramic material or another material such as lime glass, borosilicate glass, TV-glass, quartz or steel) is arranged on a slide 22 and passed under a scanning (for example moving back and forth) laser beam 23. The scanning operation of the laser beam can take place by means of a mirror. At the position of the laser beam, a forming gas (a hydrogen-containing gas comprising nitrogen and hydrogen) is supplied via a supply line 24. Behind the laser beam, there may be a cooling zone A, with or without forced cooling by means of air. Subsequently, a water-containing atmosphere, such as an aqueous aerosol, may be supplied, preferably, to zone B, whereafter preferably in zone C the layer is dried by means of dry air (or another gas, such as nitrogen). In this manner, a layer, such as a sol-gel coating, which is applied to the screen is cured.

Figure 3:
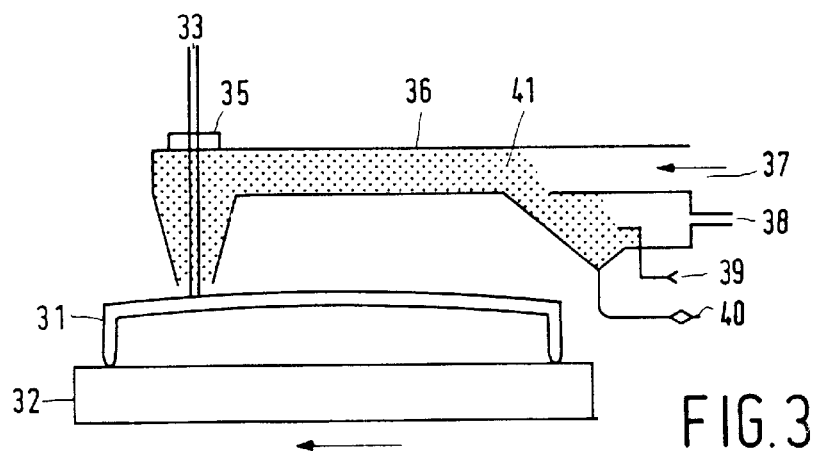
FIG. 3 illustrates another arrangement for carrying out the method in accordance with the invention.

A second embodiment is illustrated in FIG. 3. In this embodiment the laser treatment is carried out in an atmosphere of a forming gas, whether or not mixed with air, which atmosphere is saturated with an aqueous aerosol. The fineness of said aerosol can be varied by adjusting an atomizer. FIG. 3 shows a conduit 36 comprising a window 35 for a laser beam 33 and further the supply lines 37, 38 and 39 for supplying a hydrogen-containing gas (supply line 37), air or another gas for producing an aqueous aerosol (supply line 38) and water (supply line 39). The arrangement further comprises a discharge pipe 40 for draining away water. In the Figure, the aerosol is schematically represented by dots 41.

In embodiments, solvents or reagents may be dissolved in the aqueous aerosol. It is additionally possible to statically charge the aqueous aerosol particles. Static charging of the water particles enables a better use (lower losses) of the aerosol.

The film itself preferably absorbs little or no laser light. The energy of the laser is released in a thin layer (approximately 10 $\mu$m or less) directly underneath the film. The absorption of laser light by a material generally proceeds in accordance with a power of e ($e^{-d/d0}$), wherein d0 is a constant and d is the distance to the surface of the layer. Preferably, the value of d0 for the film substantially exceeds the thickness d of the film (d/d0<1) and d0 for the substrate is less than 10 $\mu$m. As a result thereof, the film absorbs little laser light and the energy of the laser is released in a thin layer directly underneath the film. In comparison with a situation in which a substantial part of the laser energy is released in the film, the preferred method is more favourable because the temperature in the film is more homogeneous and the risk of ablation of the film is reduced. The film is heated and cured from below. This is favourable because the reaction products formed during densification of the porous layer can escape through the as yet porous upper layer. If the film itself absorbs, so that the energy is mainly released in the film itself, the highest temperature occurs in the uppermost part of the film. This part of the film is densified first during curing and forms a barrier for reaction products. It is also possible that the temperature in the upper layer of the film increases so much that ablation of the film takes place.

However, the temperature of the display window as a whole does not increase or increases very little. By virtue of the movement of the laser beam with respect to the surface, the heat penetrates hardly, if at all, into the display window. In other words, so very much heat is supplied to the film, per mass unit of the film, and is generated, in the preferred embodiment, directly underneath the film, so that the temperature of the film increases to very high values (several hundred degrees centigrade) within a very short period of time (within a few seconds), thereby causing the film to cure. However, the supply of heat to the display window, per mass unit of the display window, is small so that no or few thermal stresses occur in the display window.

It has been found that if the laser treatment is carried out in a hydrogencontaining atmosphere, the conductance of the layer is favourably affected.

A requirement to be met by cathode ray tubes is that the field strength of the stray field emitted by the cathode ray tube is below a minimum value at some distance from the cathode ray tube. This is also referred to as "electromagnetic shielding (EMS)". To meet this requirement, a conductive layer which has been provided must exhibit a relatively low electrical resistance. It has however been found that if the layers are cured by annealing, the conductivity of the conductive layers increases, under the influence of air, and hence EMS decreases.

If these layers, for example a sol-gel coating of ITO (layers comprising $SnO_2/In_2O_3$) are cured by means of a laser in a hydrogen-containing atmosphere, the resistance is reduced such that this reduction is stable.

A further preferred embodiment is characterized in that the laser-heating operation takes place in a water-containing atmosphere. This too results in a stable improvement of the conductivity.

This effects in question are substantial and result in an improvement of several hundred times, said improvement being stable and re-heating to a high temperature does not adversely affect the conductivity.

The method can be used to apply films (also referred to as coatings) on an element of a cathode ray tube, however, the above-described disadvantages of the prior art as well as the advantages of the invention also apply to the provision of coatings on other substrates, such as in and on LCDs (Liquid Crystal Displays) or on synthetic resins.

The invention can also be used to apply an anti-reflective layer on the inner or outer surface of the display window. For this purpose, for example a tetraethyl orthosilicate (TEOS) or tetraethyl orthotitanate (TEOTI) solution in an alcohol is sprayed or spun onto the surface, and subsequently cured in accordance with the inventive method. The resulting film is an $SiO_2$ or $TiO_2$ film. It will be obvious that within the scope of the invention many variations are possible to those skilled in the art.

We claim:

1. A method of curing a film provided on the surface of a substrate, said method comprising: providing on said surface of said substrate a film that absorbs less laser light than said substrate, subjecting said film to a laser beam incident on a limited area of said film while scanning said surface, said film absorbing little or no laser light and release of energy, from said laser beam, for heating the film being concentrated essentially only in the substrate area underneath said film to a depth of less than 10 $\mu$m thereby preventing essentially all thermal stress formation in said substrate.

2. The method of claim 1 wherein, while being subjected to said laser beam, the film, provided on the surface of the substrate, is in a hydrogen containing atmosphere.

3. A method as claimed in claim 2 wherein the film is a sol-gel coating of ITO.

4. A method as claimed in claim 2 wherein the substrate is a display window for a cathode ray tube.

5. A method as claimed in claim 1 characterized in that the film is a sol-gel coating of ITO.

6. A method as claimed in claim 1 characterized in that the substrate is a display window of or for a cathode ray tube.

7. A method as claimed in claim 1, characterized in that conductive film is cured by the laser beam in a water-containing atmosphere or in that a water-containing atmosphere is supplied immediately after the curing operation.

8. A method as claimed in claim 7, characterized in that the film is a sol-gel coating of ITO.

9. A method as claimed in claim 1, characterized in that a conductive film is cured by the laser beam in a hydrogen-containing atmosphere.

10. A method as claimed in claim 9, characterized in that the film is a sol-gel coating of ITO.

11. A method as claimed in claim 9, characterized in that a conductive film is cured by the laser beam in a water-containing atmosphere or in that a water-containing atmosphere is supplied immediately after the curing operation.

* * * * *